R. A. PATRICK.
FLEXIBLE COUPLING FOR PROPELLER SHAFTS.
APPLICATION FILED APR. 20, 1917.
1,328,893.
Patented Jan. 27, 1920.
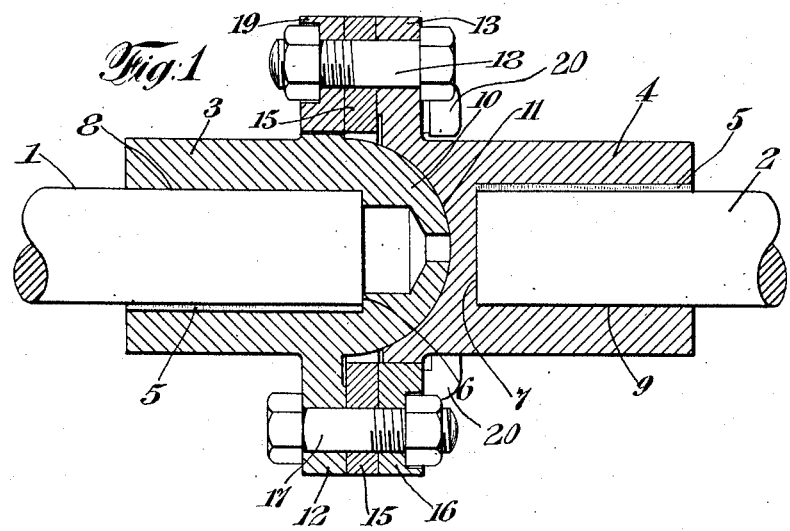
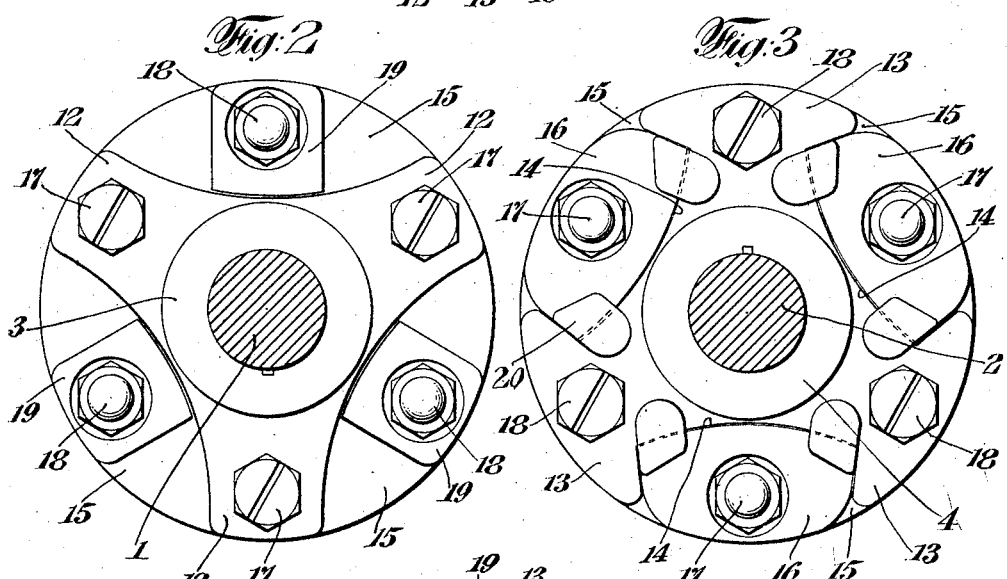
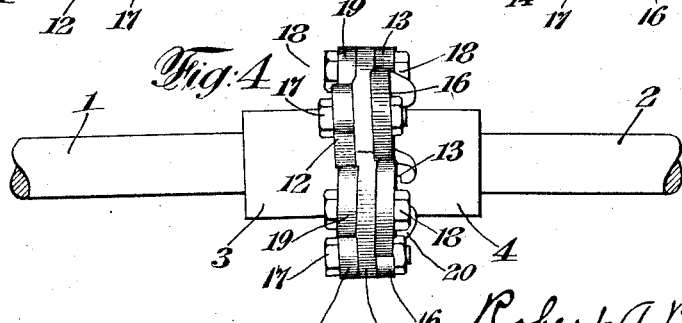
INVENTOR
Robert A. Patrick
BY
Davis & Davis
his ATTORNEYS.

UNITED STATES PATENT OFFICE.

ROBERT A. PATRICK, OF FREEPORT, NEW YORK, ASSIGNOR TO COLUMBIAN BRONZE CORPORATION, OF FREEPORT, NEW YORK, A CORPORATION OF NEW YORK.

FLEXIBLE COUPLING FOR PROPELLER-SHAFTS.

1,328,893.　　　　Specification of Letters Patent.　　Patented Jan. 27, 1920.

Application filed April 20, 1917. Serial No. 163,325.

*To all whom it may concern:*

Be it known that I, ROBERT A. PATRICK, a subject of the King of Great Britain, a citizen of Canada, residing in Freeport, Long Island, county of Nassau, and State of New York, have invented certain new and useful Improvements in Flexible Couplings for Propeller-Shafts, of which the following is a specification.

This invention relates to flexible couplings for shafting, and more particularly to couplings for connecting the adjacent ends of two sections of shafting one of which is journaled at an angle with respect to the other. The invention is especially applicable for coupling propeller shafts to engine shafts.

The principal object of the invention is to provide a flexible coupling of the class described in which a strong driving connection is maintained between the coupled shafts.

A further important object is the provision of a flexible coupling in which a constant driving connection is maintained between rigid parts of the coupling members.

Another object of the invention is the provision of a flexible coupling having simple means for relieving the flexible driving connection from strain resulting from end-thrust of the coupled shafts.

In the drawings, Figure 1 is a longitudinal sectional view;

Fig. 2 an end elevation, looking at the coupling, as shown in Fig. 1, from the left;

Fig. 3 a view similar to Fig. 2, looking from the right; and

Fig. 4 a side elevation.

Referring to the various parts by numerals, 1 designates a driven shaft, such as a propeller shaft, and 2 designates a driving or engine shaft. A sleeve 3 is fixed on the inner end of shaft 1, to rotate therewith, and a sleeve 4 is fixed on the inner end of the shaft 2 to rotate with said shaft, by means of keys 5, or otherwise. The ends of the shafts 1 and 2 abut against the end walls 6 and 7, respectively, of the shaft-receiving sockets 8 and 9 in the sleeves 3 and 4. The inner end of sleeve 3 is formed with a rounded and substantially hemispherical extension or bearing member 10, having a bearing in a correspondingly rounded recess or seat 11 formed in the inner end wall of the sleeve 4.

Adjacent its inner end, the sleeve 3 is provided with a plurality of laterally extending spaced arms 12, preferably three in number. The arms 12 are rigidly connected to the sleeve 3 and are preferably formed integrally therewith. The sleeve 4 is formed adjacent its inner end with rigid spaced arms 13 corresponding in number with the arms 12. The sides of the arms 13 are shaped to form angular recesses 14 between said arms. The recesses 14 are preferably made of substantially dovetail form, as shown in the drawings.

An annular ring 15 of leather or other suitable flexible material surrounds the extension 10 on sleeve 3 and is interposed between the arms 12 and 13. The spaced arms 12 and 13 are arranged in staggered relation, the arms 12 being opposite the dovetailed recesses 14 between the arms 13, and the arms 13 being opposite the spaces between arms 12.

To provide a rigid driving connection between the arms 12 and 13, the arms 12 are rigidly connected to interlocking clutch members 16 loosely seated in the recesses 14 between the arms 13. The members 16 have a sliding movement in the recesses 14 in a direction longitudinally of the shafts 1 and 2 and also have a slight rocking or tilting movement in said recesses. The members 16 are rigidly secured to arms 12 by bolts 17 passing through the arms 12, leather ring 15 and said members 16.

To prevent longitudinal separation of the parts, the arms 13 are secured to the flexible ring 15, preferably by means of bolts 18 passing through said arms and ring, and through members or washers 19 at the opposite side of said ring.

In Fig. 4 of the drawings the coupling is shown applied to the adjacent ends of two shafts, the propeller shaft 1 inclining downwardly from the engine shaft 2. It will be obvious that as the shafts rotate power is transmitted to arms 12 from arms 13 through the laterally slidable blocks or clutch members 16 rigidly mounted on the arms 12. This rigid driving connection is always maintained, the members 16 sliding back and forth in the seats 14 to compensate for the variations in the relative positions of the arms 12 and 13 during rotation of the shafts. It will be obvious that the member or members at one point will be moved in a direction opposite to that of the diametrically opposed member or members. The flexible connecting and driving ring 15 affords a constant and positive but yielding connection between the arms 13 and the blocks 16 carried by arms 12. As above described, the blocks 16 are loosely seated in the recesses 14 between arms 13 to permit free sliding and lateral rocking or tilting movements of the interlocking members of the coupling relatively to each other during rotation of the coupled shafts. This relative movement is comparatively extensive, especially when the coupling is employed to connect the engine and propeller shafts of a vessel which are commonly supported at an angle to each other as indicated in Fig. 4 of the drawings. By connecting the loosely interlocked rigid members of the coupling by a flexible driving ring it will be obvious that a smooth, even and quiet driving connection is obtained, eliminating the constant jerking which occurs between two loosely engaging driving members and also eliminating the noise and excessive wear incidental to the constantly recurring shocks in such a connection as well as the resultant strains on the propeller and the shafting. The flexible ring 15 serves to cushion both the relative tilting movement of the coupling members and the relative rotary movement between the loosely interlocked parts of the coupling.

The end thrust of the propeller shaft is taken up by the ball and socket connection between the bearing extension 10 and seat 11. To prevent rupture of the leather ring 15 by the pull of the propeller shaft 1 when the propeller is reversed, I provide each of the members 16 with a pair of lugs 20 the ends of which extend inwardly behind the arms 13 on the sleeve 4 and are normally spaced therefrom as shown in Figs. 1 and 4, to permit the sliding and rocking movement of the members 16 heretofore described. These lugs 20 serve to limit the extent of the lateral movement of the members 16 to the left, as shown in Figs. 1 and 4, and thus prevent excessive strain on the leather connecting ring 15 when the propeller is driven in the reverse direction. The flexible driving connection is thus relieved of excessive end thrust strains.

From the foregoing it will be seen that an exceedingly strong and simple coupling is provided whereby shafts journaled at an angle may be driven, and that a driving connection between the shafts is maintained through strong and rigid members that are in constant engagement with each other.

What I claim is:

1. In a device of the class set forth, the combination of a pair of coupling members, rigid interlocking members held to the coupling members having relative sliding and tilting movements in interlocked relation, and a flexible connecting and driving member interposed between the coupling members and positively held to the interlocking members.

2. A shaft coupling comprising a pair of coupling members, coöperating rigid loosely interlocked members rotatable with the coupling members, a flexible connecting member rigidly held to said interlocked members, and means for positively limiting the extent of movement of the coupling members toward and from each other.

3. A shaft coupling comprising a pair of sleeves adapted for connection to shafts to be coupled, spaced arms rigidly connected to each sleeve, a flexible connecting member interposed between said arms and rigidly secured thereto, and a series of rigid blocks loosely engaged between the arms on one sleeve and rigidly held to the arms on the other sleeve and to the flexible connecting member.

4. A shaft coupling comprising a pair of sleeves adapted for connection to shafts to be coupled, spaced arms rigidly connected to each sleeve, means rigidly extending from the arms on one sleeve having a sliding engagement between the arms on the other sleeve whereby said arms may have a relative lateral movement without breaking the driving connection therebetween, and a flexible annular member interposed between the arms on said sleeves and secured to said arms.

5. A shaft coupling comprising a pair of coupling members adapted for connection to shafts to rotate therewith, spaced arms rigidly held to said members, one of said coupling members having a rounded bearing member extending axially from the inner end thereof and engaging a corresponding rounded recess formed in the other coupling member, a flexible annular member interposed between the arms and connected therewith, and blocks slidably seated between the arms on one of said coupling members and rigidly secured to the arms on the other coupling member, the arms of one coupling member being arranged in staggered relation with the arms on the other member.

6. A shaft coupling comprising a pair of coupling members adapted for connection to shafts to rotate therewith, spaced arms rigidly held to said members, the arms on one member being staggered with respect to the arms on the other member, a flexible annular member secured to the arms, blocks seated in the spaces between the arms on one of the coupling members and having a sliding movement longitudinally of said member, and means for rigidly connecting the blocks with the arms on the other coupling member.

7. A device of the class set forth comprising a pair of coupling members each provided with radially extending arms, an annular connecting member of flexible material interposed between the sets of radial arms, fastening devices extending through the arms and said annular member, and blocks engaging between the arms of one member and held against the adjacent face of said annular member by the fastening devices which connect the annular member to the arms of the other coupling member.

8. A device of the class set forth comprising a coupling member provided with a plurality of radially extending projections, blocks engaging between said projections and shiftable longitudinally of the coupling member, an annular flexible member held to said projections, a second coupling member provided with radially extending projections, fastening devices for securing said blocks and the annular member to the projections on the second coupling member, and means for positively limiting the extent to which the annular member may be flexed.

9. A device of the class set forth comprising a coupling member provided with a plurality of radially extending projections, blocks engaging between said projections and shiftable longitudinally of the coupling member, an annular flexible member held to said projections, a second coupling member provided with radially extending projections, and fastening devices for securing said blocks and the annular member to the projections on the second coupling member, said blocks being formed with lugs adapted to engage the projections with which the blocks are engaged to limit the movement of the blocks relatively to said projections.

10. A device of the class set forth comprising a coupling member provided with a plurality of radially extending projections, blocks engaging between said projections and shiftable longitudinally of the coupling member, an annular flexible member held to said projections, a second coupling member provided with radially extending projections, fastening devices for securing said blocks and the annular member to the projections on the second coupling member, said blocks being formed with lugs adapted to engage the projections with which the blocks are engaged to limit the movement of the blocks relatively to said projections, and said coupling members being provided with an axially arranged end-thrust resisting connection.

In testimony whereof I hereunto affix my signature.

ROBERT A. PATRICK.